United States Patent Office 2,856,869
Patented Oct. 21, 1958

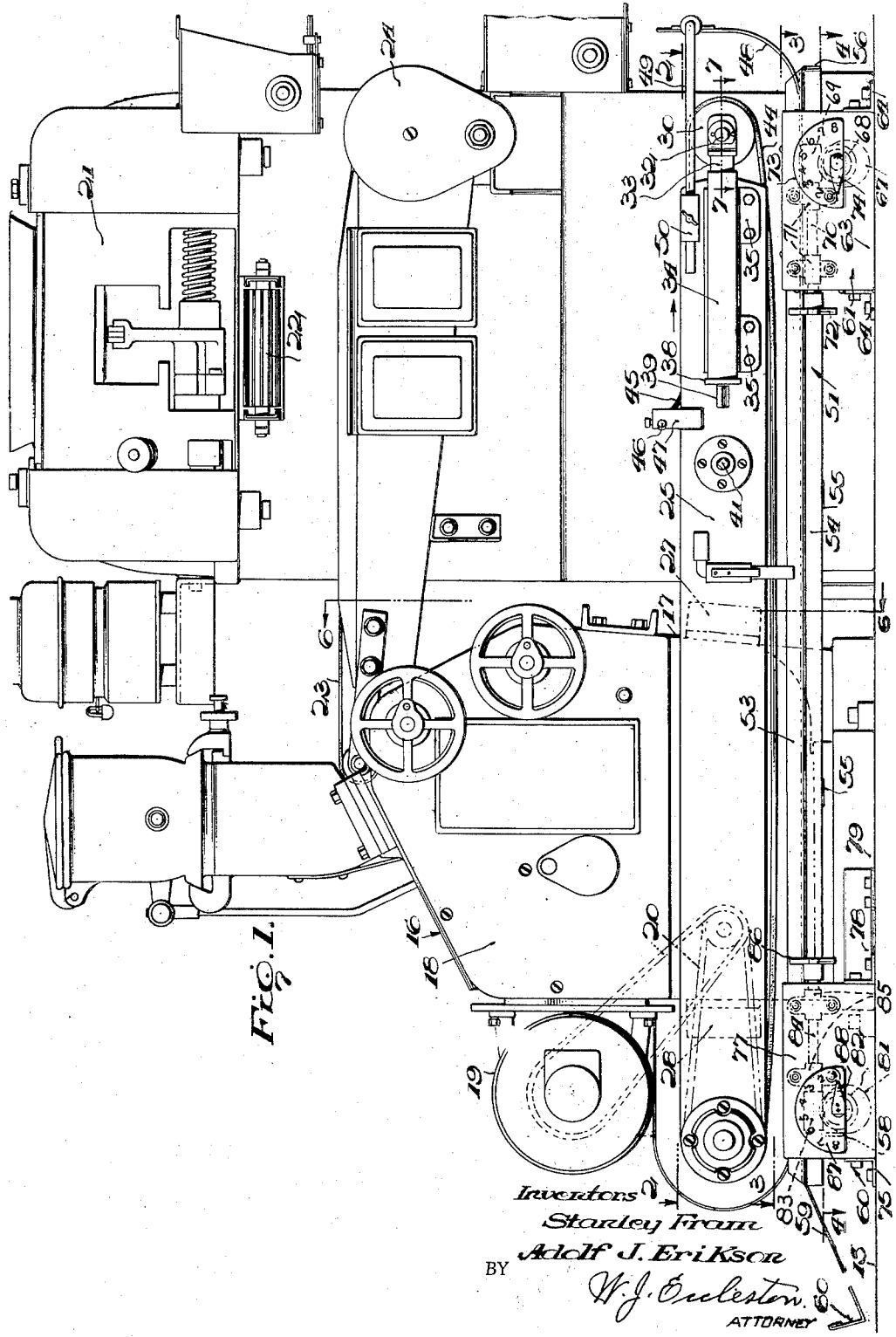

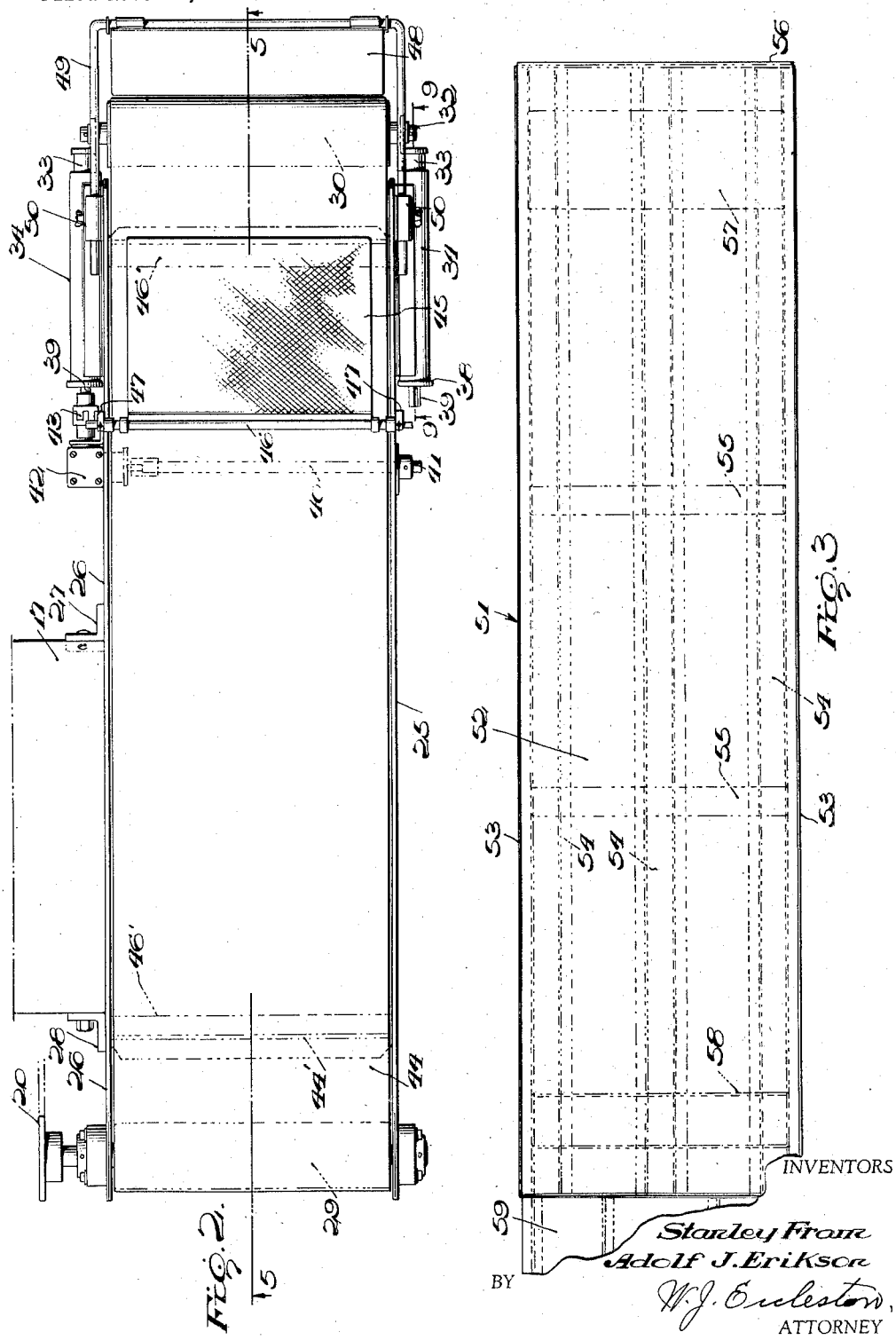

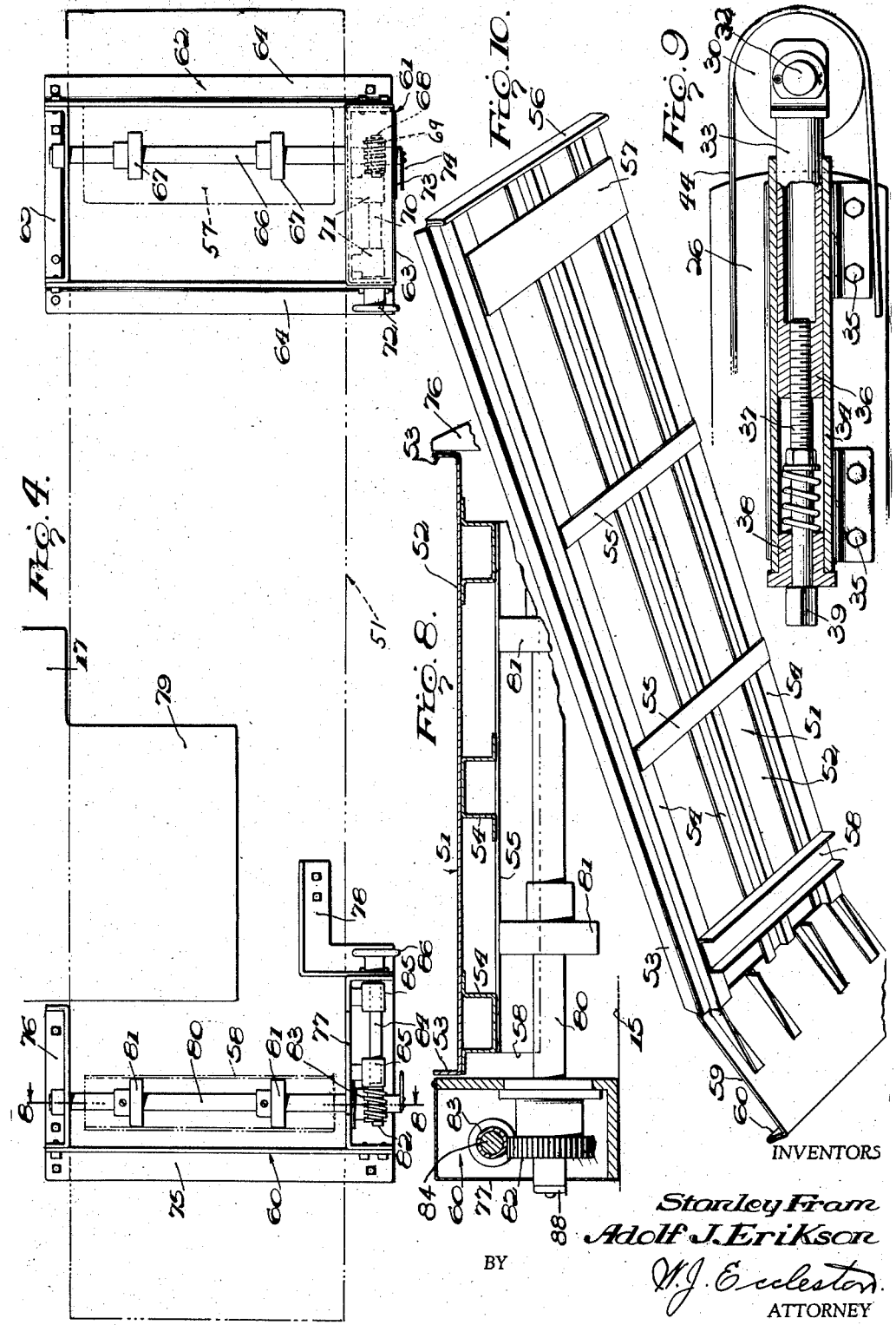

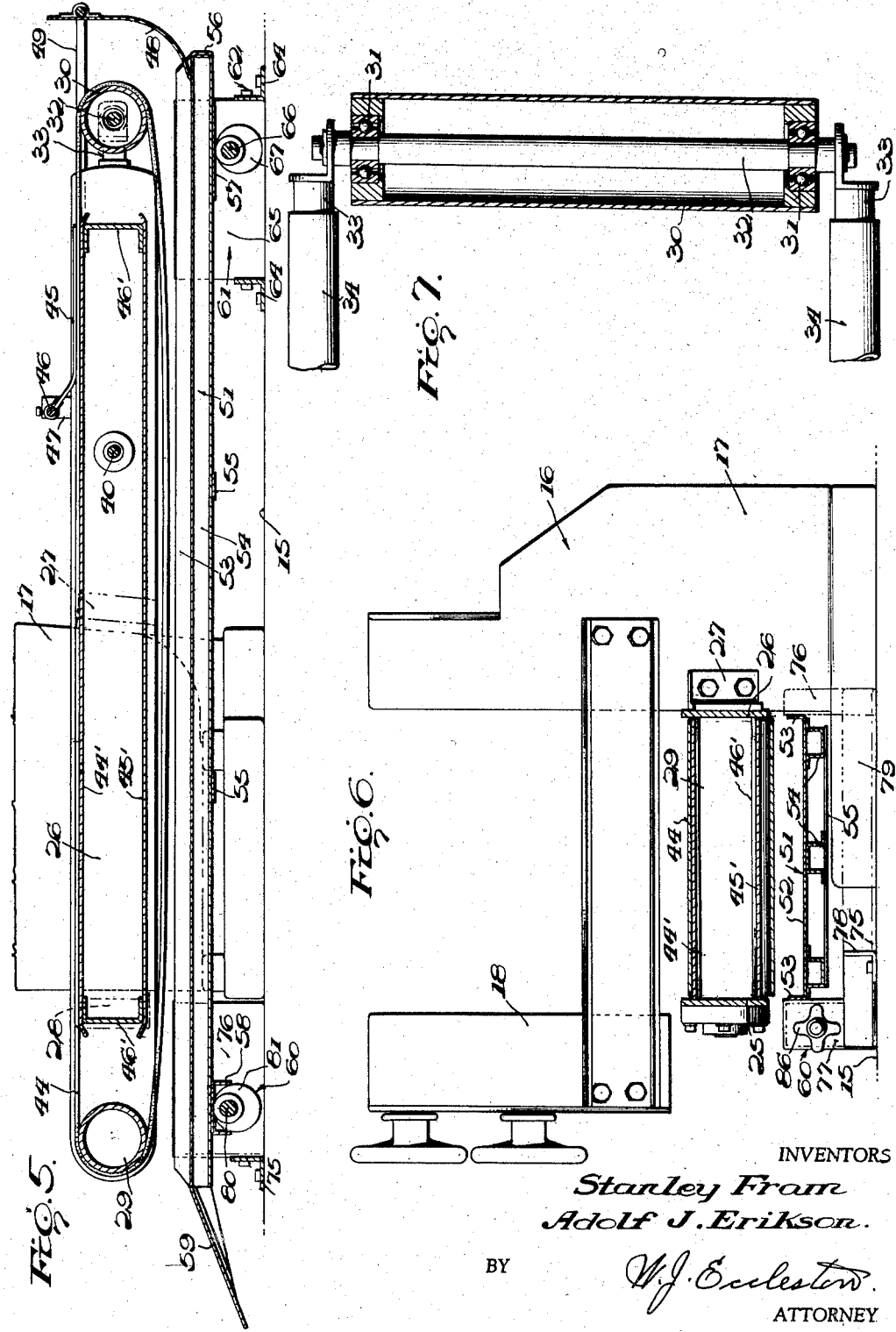

2,856,869

BREAD DOUGH MOLDING MACHINE

Stanley Fram, Framingham, and Adolf J. Erikson, Dedham, Mass., assignors to the United States of America as represented by the Secretary of the Army Application November 21, 1955, Serial No. 548,282

11 Claims. (Cl. 107—9)

(Granted under Title 35, U. S. Code (1952), sec. 266)

The invention described herein, if patented, may be manufactured and used by or for the Government for governmental purposes, without the payment to us of any royalty thereon.

The present invention relates to bakery machinery, and more particularly to a bread dough molding machine. An object of the invention is to provide a molder which will efficiently produce bread loaves of uniform shape and size, with a smooth outer surface.

Another object is to provide means for sealing or twisting the ends of the dough pieces as they pass through the molder, to thereby prevent loss of dough, and rendering the bread loaves uniform as to length.

Another object is to provide an improved metal pressure board, together with the novel and simplified means for adjustably mounting the same beneath the molder belt of the machine.

A further important object is to provide a molder which is so constructed that the endless molder belt is readily removable edgewise from the means which support it, without the need for dismantling other components of the machine.

Still another object of the invention is to provide novel and simplified means for adjusting the tension of the molder belt entirely from the outer side of the machine, the inner side of the belt being relatively inaccessible.

Another object is to provide a bread dough molder wherein the molder belt and dough sheeting mechanism are supported at their inner sides only in cantilever fashion, whereby the outer sides of the mechanism are free from obstructions and have no floor engaging legs or supports at their outer sides, thereby rendering the machine readily accessible for servicing, maintenance and the like.

Other objects and advantages of the invention will be apparent during the course of the following description.

In the accompanying drawings, forming a part of this application, and in which like numerals are employed to designate like parts throughout the same, Figure 1 is a side elevation of the bread dough molding apparatus in accordance with the present invention, Figure 2 is a horizontal section taken substantially on line 2—2 of Figure 1 with parts omitted for the purpose of simplification, Figure 3 is a similar view taken substantially on line 3—3 of Figure 1, parts omitted and parts broken away, Figure 4 is a similar view taken substantially on line 4—4 of Figure 1, Figure 5 is a central vertical longitudinal section taken on line 5—5 of Figure 2, Figure 6 is a transverse vertical section taken substantially on line 6—6 of Figure 1 with parts omitted for the purpose of simplification, Figure 7 is an enlarged fragmentary horizontal section taken on line 7—7 of Figure 1, Figure 8 is an enlarged transverse vertical section taken on line 8—8 of Figure 4, Figure 9 is an enlarged longitudinal vertical section taken on line 9—9 of Figure 2, and, Figure 10 is a bottom perspective view of the pressure board removed.

In the drawings, wherein for the purpose of illustration is shown a preferred embodiment of the invention the numeral 15 designates a suitable horizontal supporting bed or floor such as the bed of a truck trailer or the like. Rigidly mounted upon the bed or floor 15 is a molder head 16, including a vertical portion 17 and a horizontal portion 18 which projects horizontally forwardly of or beyond one side of the portion 17 in cantilever fashion. The horizontal portion 18 of the molder head is thus spaced above the bottom of the vertical portion 17 and bed 15 for a substantial distance, and the lower end of the portion 17 is rigidly secured to the bed by any suitable means. The horizontal portion 18 of the molder head carries conventional dough sheeting rolls or mechanism, not shown, for depositing sheeted sections of dough upon the molder conveyor belt to be described.

Rigidly mounted upon one vertical side of the molder head 16 is suitable driving mechanism including a motor 19 and gearing 20 operatively connected therewith. This motor and gearing drive the sheeting rolls carried by the head portion 18 in a conventional manner, and details of the sheeting mechanism form no part of this invention and need not be illustrated or described.

Conventional dough divider mechanism 21 is arranged near one end of the machine and adjacent one side of the molder head 16 and this mechanism is likewise rigidly mounted upon the horizontal bed 15 by any suitable means. The divider mechanism 21 embodies conventional dough discharge means 22 for depositing measured quantities of bread dough upon a substantially horizontal moving belt 23 which conveys the divided dough to the inlet of the sheeting mechanism carried by the head portion 18. The belt 23 is driven by gearing 24, operated by a source of power, not shown. It should be understood that the mechanism or unit 21 extends downwardly to the bed 15 on the same side of the molder belt mechanism, to be described as the vertical portion 17 of the head 16.

A horizontal elongated molder belt frame is provided, including frame sides 25 and 26, and this frame and the belt mechanism carried thereby is arranged below the head portion 18, transversely thereof and spaced above the bed 15 a suitable distance. The frame sides 25 and 26 extend adjacent to corresponding sides of the vertical head portion 17 and the divider mechanism 21, Figure 1, throughout substantially the entire length of the machine. The innermost or rear frame side 26 carries a pair of spaced L-shaped brackets 27 and 28, rigidly secured thereto, and these brackets are rigidly secured to opposite sides of the upstanding molder head portion 17 at an elevation above the bed 15 as shown in Figures 1 and 6. The horizontal molder belt mechanism is thus bodily carried by the brackets 27 and 28, which in turn are supported by the vertical portion 17 of the molder head. The horizontal portion 18 of the molder head carrying the dough sheeter mechanism is arranged in vertically spaced superposed relation to the conveyor belt mechanism including frame sides 25 and 26. The conveyor belt mechanism is supported at its inner side only by the brackets 27 and 28 and projects laterally forwardly of the vertical portion 17 and divider mechanism 21 in cantilever fashion. The outer side of the conveyor belt mechanism like the outer side of the head portion 18 is unsupported and free of obstructions or legs leading to the bed 15. Thus, the molder head portion 18 and horizontal molder belt mechanism including frame sides 25 and 26 are arranged at corresponding sides of the vertical portion 17 and divider mechanism 21 in overhanging spaced superposed relation to the bed 15. The frame sides 25 and 26 and associated elements to be described also extend in cantilever fashion for a substantial distance beyond the supporting bracket 27 toward the right hand end of the machine in Figure 1. For a lesser distance, the frame sides 25 and 26 and associated elements extend in cantilever fashion beyond the bracket 28 and the adjacent side of the vertical head portion 17 as best shown in Figure 1. As previously stated, the brackets 27 and 28 afford the two points of support for the molder conveyor belt mechanism embodying the frame sides 25 and 26.

A transverse horizontal belt driving roller 29 is journaled between one pair of ends of the frame sides 25 and 26, Figure 2, and operatively connected with the gearing 20 as indicated generally in Figures 1 and 2. Near and beyond the opposite ends of the frame sides 25 and 26, an adjustable belt tensioning roller 30 is rotatably mounted by bearings 31 or the like upon a horizontal transverse shaft 32, having its ends secured to the leading ends of longitudinally adjustable arms 33, Figure 7. The adjusting arms 33 engage telescopically within horizontal longitudinal sleeves 34, rigidly secured at 35 to the outer faces of frame sides 25 and 26 near the right hand end of the machine, Figure 1. The arms 33 may be tubular as shown in Figure 9, with internally screw-threaded portions or nuts 36 formed integrally therewith for screw-threaded engagement with suitable adjusting screws 37 arranged within the sleeves 34 and extending through the ends of the sleeves remote from the roller 30, Figure 9. The outer ends of the adjusting screws 37 are preferably journaled in bearings 38 held within corresponding ends of the sleeves 34, and the screws 37 are provided at their extreme ends with square or polygonal portions or heads 39 to facilitate turning them upon their longitudinal axis. The adjusting screw 37 adjacent the outer frame side 25 is turned directly by means of a wrench or the like, but the adjusting screw 37 adjacent the inner frame side 26 is relatively inaccessible due to the presence of the divider mechanism 21 and molder head 16. Accordingly, means are provided for adjusting or turning the innermost adjusting screw 37 from the outer side of the molder belt mechanism. Such means comprises a transverse horizontal shaft 40, Figure 2, extending transversely of the frame sides 25 and suitably journaled thereon between the upper and lower reaches of the molder belt to be described. The shaft 40 is provided at its outer end with a square or polygonal head 41 to be engaged by a wrench or the like, and the head 41 is arranged near the head 39 as shown in Figure 2. The inner or remote end of the shaft 40 is suitably connected with a right angle miter gear unit 42, rigidly secured to the adjacent inner frame side 26, Figure 2, and this miter gear unit has its driven shaft operatively coupled at 43 with the head 39 of the adjusting screw 37 upon the inner side of the molder belt mechanism. Thus, by turning the shaft 40 with a wrench from the outer side of the machine, the inner arm 33 of the belt tensioning mechanism shown by Figures 2 and 9 can be adjusted longitudinally along with the arm 33 at the outer side of the mechanism. Through this means, the roller 30 is bodily adjusted longitudinally of the frame sides 25 and 26 to place the desired tension upon the molder belt.

A horizontal endless flexible molder conveyor belt 44 engages the rollers 29 and 30, as shown. This belt has its upper and lower reaches or runs disposed substantially at the upper and lower longitudinal edges of the frame sides 25 and 26, so that the belt 44 can be readily removed edgewise over the outer frame side 25 without removing the frame side. The belt 44 is preferably formed of laminated canvas, or the like, impregnated with synthetic rubber. The belt is preferably unspliced, or continuous throughout its entire length. The upper arm of the belt 44 passes beneath the bottom of the sheeter head portion 18, in relatively close proximity thereto so that it may receive the thin sheeted sections of bread dough passing from the sheeter mechanism of the head portion 18 for conveyance by the belt toward the right hand end of the machine as shown in Figure 1.

In order to firmly support the upper and lower runs of the belt 44 against appreciable downward and upward flexure, respectively, a pair of vertically spaced flat horizontal plates or aprons 44' and 45' are arranged respectively underneath and just above the upper and lower reaches of the belt 44, Figures 5 and 6. These belt supporting aprons 44' and 45' are arranged between the frame sides 25 and 26 and may extend throughout a major portion of the length of the belt 44 as indicated in Figure 2. The aprons 44' and 45' are rigidly secured near their opposite ends to transverse brackets 46' which have their ends rigidly secured by any suitable means to the inner sides of the frame members 25 and 26. By this means, the upper and lower reaches of the belt 44 are prevented from sagging downwardly or upwardly, respectively.

A dough curler mat 45 of conventional construction contacts the upper run of the belt 44 somewhat beyond the discharge side of the dough sheeting mechanism, Figure 1. The leading end of this mat is secured to a transverse horizontal bar 46, having its ends suitably detachably secured to brackets 47, which are in turn rigidly secured to the frame sides 25 and 26. As the sheeted sections of dough pass beneath the curler mat 45, they are rolled up into elongated spiral formations, transversely of the belt 44, prior to being discharged from the top run of the belt, as is well known.

A guide or deflector plate 48 for the curled dough pieces is supported adjacent the discharge end of the belt 44, as shown, by a horizontal U-shaped yoke 49 having its opposite sides adjustably clamped within horizontal sleeves 50, rigidly secured to the outer sides of the frame sides 25 and 26. The deflector plate 48 receives the curled dough pieces at the discharge end of the belt 44 and directs the same downwardly and rearwardly onto the pressure board to be described.

A horizontal elongated rectangular pressure board 51 is arranged beneath the lower run of the belt 44 and extends throughout the entire length of the belt, as shown in closely spaced underlying relation thereto.

The pressure board is preferably formed entirely of stainless steel or other non-corrosive sheet metal. The pressure board 51 comprises an upper flat horizontal plate or body portion 52 having upstanding longitudinal side flanges 53 formed integral therewith, throughout its entire length . The flanges 53 are in substantial vertical alignment with the longitudinal edges of the lower run of the belt 44, and spaced a slight distance below the same as best shown in Figure 6. The pressure board is provided upon its bottom with a plurality of laterally spaced longitudinal stiffening members or channels 54, welded or otherwise rigidly secured thereto. Additional transverse braces 55 may be welded to the bottoms of the channels 54 for further strengthening the pressure board as shown in Figure 10. A downturned flange 56 may be formed upon the intake end of the pressure board 51, transversely thereof, as shown. Slightly inwardly of the flange 56, a flat transverse bearing plate 57 is welded or otherwise rigidly secured to the bottom of the pressure board 51 for engagement upon adjusting cams for the pressure board to be described. Near and inwardly of the opposite end of the pressure board 51, a transverse inverted U-shaped channel member 58 is welded or otherwise rigidly secured to the bottom of the pressure board, for engagement over other adjusting cams, to be described. At the discharge end of the pressure board 51, there is preferably provided a downwardly inclined apron 59 having an upturned lip 60, and this apron receives the molded bread loaves as they pass from the pressure board under the influence of the lower run of the molder belt 44. The pressure board 51 forms an integral substantially stiff unit which is readily removable bodily longitudinally from its position below the belt 44.

The pressure board 51 is removably mounted upon and bodily supported by a pair of adjusting cam units 60 and 61, arranged near the opposite ends of the pressure board and suitably rigidly secured to the stationary bed 15, see Figure 4. The unit 61 comprises a rectangular horizontal frame 62 which may be bolted to the bed 15, and one side of the frame 62 is formed to provide a box or housing 63 for gearing. The housing 63 projects somewhat above the transverse bars 64 of frame 62, and a longitudinal bar 65 arranged opposite the housing 63 likewise has its upper edge extending above the tops of the bars 64, to form with the inner side of the housing 63 a lateral guide or channel within which the adjacent end portion of the pressure board 51 is arranged so that the pressure board cannot shift laterally. A transverse horizontal cam shaft 66 has its opposite ends journaled respectively upon the housing 63 and frame side 65 as shown in Figure 4. This cam shaft carries a pair of spaced eccentric adjusting cams 67, rigidly secured thereto for rotation therewith, and the bearing plate 57 of the pressure board rests directly upon the tops of the cams 67 with the flanges 53 of the pressure board engaging closely between the frame side or bar 65 and the inner face of housing 63. Within the housing 63, the shaft 66 carries a gear 68, engaged and driven by a worm gear 69, rigidly secured to an adjusting longitudinal shaft 70, journaled within the housing 63, as by bearings 71. The shaft 70 lies adjacent the outer or unobstructed side of the belt 44, and below the same, near the bed 15. The shaft 70 has a hand wheel 72 secured thereto, at one end thereof, exteriorly of the housing 63. By this means, the shafts 70 and 66 may be turned for turning the adjusting cams 67, which in turn regulate or adjust the elevation of one end of the pressure board 51. The outer side of the housing 63 may be equipped with a graduated scale 73, if desired, and a pointer 74 secured to the adjacent end of the shaft 66 travels over this scale to indicate thereon various points of adjustment of the pressure board 51, thereby enabling the operator to regulate the size or thickness of the loaves of bread dough being molded.

The adjusting cam unit 60 likewise embodies a horizontal frame including a transverse bar 75 and a side longitudinal bar 76, rigidly secured thereto and projecting above the top of the bar 75. The bar 76 is at the inner side of the belt 44 and in alignment with the corresponding bar 65 of the frame 62. The opposite side of the frame may be formed to provide a box-like enclosure 77 for gearing, and this enclosure or housing projects above the bar 75 and has its inner side arranged vertically and aligned with the inner side of the housing 63, whereby the flanges 53 of the pressure board 51 may engage between the inner faces of the bar 76 and housing 77 and be held thereby against lateral shifting. The end of the housing 77 remote from the bar 75 is rigidly secured to the bed 15 by an L-shaped frame member 78, as shown in Figure 4. The bars or frame members 75 and 76 are also bolted or otherwise rigidly secured to the bed 15. As shown in Figure 4, the frame comprising members 75, 76 and 78 is made different from the frame 62, to provide room for the flat horizontal base plate 79 of the molder head 16, which base plate 79 projects forwardly of the vertical pedestal portion 17 of the head 16 as shown in Figures 4 and 6. The horizontal base plate 79 projects under the pressure board 51 in assembly, but is free of contact with the same, even when the pressure board is in the lowermost adjusted position.

A transverse horizontal cam shaft 80, similar to the shaft 66 has its ends journaled respectively on the bar 76 and housing 77, and the shaft 80 carries a pair of eccentric adjusting cams 81 which are identical to the cams 67. The outer end of the shaft 80 within the housing 77 has a gear 82 secured thereto for rotation therewith, and this gear is engaged and driven by a worm gear 83, mounted upon a longitudinal shaft 84 inside of the housing 77, and journaled within bearings 85 within the housing, as shown. The shaft 84 carries a hand wheel 86 corresponding to the hand wheel 72, by means of which the cams 81 are turned for adjusting the elevation of the adjacent end of the pressure board 51. A scale 87 and pointer 88 identical with the scale and pointer 73 and 74 are preferably provided on the unit 60, as shown in Figure 4 and in Figure 1. In assembly, the inverted U-shaped channel 58 engages over and receives therein the cams 81 as indicated in Figures 4 and 8. The top wall of the channel 58 bears directly upon the cams 81, and the sides or peripheries of the cams may engage the depending flanges of the channel 58 to prevent lengthwise movement of the pressure board 51 during the operation of the machine.

It may now be seen that the pressure board 51 rests or floats bodily upon the pairs of eccentric cams 67 and 81, directly beneath the lower reach of the belt 44. The pressure board is held against appreciable endwise movement by the channel 58, and against sidewise movement by the engagement of the flanges 53 between the inner sides of the housings 63 and 77 and bars 65 and 76, see particularly Figures 4 and 6. The pressure board is adjustable vertically at either end or at both ends by means of the hand wheels 72 and 86, and associated elements.

The operation of the machine is as follows:

Individual batches or pieces of raw dough are discharged from the dough divider 21 by its outlet means 22 onto the conveyor belt 23, which transports the divided dough to the left, Figure 1, and discharges it into the rolling or sheeting mechanism housed in the molder head portion 18. The sheeting mechanism rolls the individual dough pieces into individual flat sheets and deposits them successively and in spaced relation upon the top run of the belt 44 which travels in the direction of the arrow in Figure 1. The sheeted dough now passes under the curler mat 45 which curls or rolls each sheet into an elongated spirally wound roll transversely of the belt 44, and the rolls of dough are each successively discharged from the right hand end of the belt 44, Figure 1, and passed downwardly to the right hand or intake end of the pressure board 51, after being assisted or guided by the deflector plate 48.

As the rolled dough sections pass or roll onto the adjacent end of the pressure board 51, they will come into contact with the lower reach of the belt 44, and the belt will press the rolls of dough downwardly against the top of the pressure board 51, while simultaneously advancing the dough lengthwise over the pressure board toward its left hand discharge end, Figure 1. The pressure board 51 is of course adjusted to the desired height by means of the adjusting cam units 60 and 61 prior to starting the cycle of operation, and the belt 44 likewise has the desired tension placed thereon by means of the adjusting arms 33 and associated elements, prior to starting the cycle of operation.

As the individual sections of dough thus pass longitudinally over the pressure board 51, they are subjected to a kneading or squeezing and rolling action by the lower run of the belt 44, and this action may be controlled as desired by the operator through the use of the hand wheels 72 and 86.

A feature of the invention resides in the coaction of the flanges 53 with the adjacent longitudinal edges of the lower reach of the belt 44 upon the ends of the dough sections or loaves being formed by the machine. As the dough is molded into loaves, the individual dough sections will become elongated and generally cylindrical transversely of the pressure board 51. When the ends of the dough sections reach and contact the flanges 53, these flanges together with the longitudinal edges of the lower reach of the belt 44 will twist and seal the ends of the dough loaves and prevent any excess dough from being cut off and lost outwardly of the frame sides 25 and 26. The dough loaves will have imparted to them sealed or rounded ends by the flanges 53 and the adjacent longitudinal edges of the belt 44, and the completed or molded dough loaves which are discharged from the left hand end of the pressure board 51, Figure 1, will pass onto the inclined apron 59 with substantially smooth outer surfaces and shaped in the desired manner.

The pressure board 51 may be readily removed endwise from the left hand end of the machine, Figure 1, without disturbing other components of the machine. The metal pressure board is easy to clean and otherwise requires no maintenance, and will last indefinitely.

In order to remove the belt 44, it is merely necessary to reduce the tension of the same as far as possible by means of the adjusting screws 37 and associated elements, and then remove the U-shaped yoke 49 and the bar 46 carrying the curler mat 45. When this is done, the belt 44 may be removed sidewise or edgewise from the rollers 29 and 30, without even removing the outer frame side 25. This is rendered possible since the overhanging head portion 18 and the supporting frame for the belt 44 are supported at their inner sides only, in cantilever fashion, and there are no floor engaging legs or obstructions at the outer sides of the head portion 18 or molder conveyor belt to interfere with the ready removal of the belt, as above described. The machine is thus constructed so that it is highly simplified, compact and very easy to maintain or service. It will operate in a highly efficient manner for forming dough into properly shaped smooth surfaced loaves without loss of dough along the longitudinal sides of the pressure board, as previously explained.

It is to be understood that the form of the invention, herewith shown and described is to be taken as a preferred example of the same, and that various changes in the shape, size and arrangement of parts may be resorted to, without departing from the spirit of the invention or scope of the subjoined claims.

We claim:

1. In a bread dough molding machine, as a subcombination, a generally horizontal pressure board to receive sections of dough thereon for molding by means arranged above the pressure board, a pair of adjusting cam units arranged beneath the pressure board and bodily supporting it adjacent opposite ends thereof, each unit including a rotary cam shaft extending transversely of the pressure board beneath the bottom of the same and one or more cams fixed on the said shaft, means for turning said cam shaft of each cam unit to thereby regulate the height of the pressure board, a bearing plate secured to the bottom of the pressure board near one end thereof and engaging the cams of one of said units, and a channel member having a web secured to the underside of the pressure board and flanges disposed in depending relation with respect thereto transversely of the board at a position adjacent its opposite end to position the said flanges on opposite sides of the cams of the cam unit at the said end of said pressure board thereby to prevent endwise movement of the pressure board.

2. In a dough molding machine having a supporting framework and mechanism for sheeting and curling dough into spiral coils, an endless belt type conveyor having an upper run and a lower run; means for supporting said endless conveyor on said framework at a fixed position above the base of said machine, said upper run cooperating with said sheeting and curling mechanisms to form spiral coils of dough thereon, a pressure board to cooperate with the lower run of said conveyor in forming cylindrical rolls of dough from the spiral coils of dough delivered thereto from said upper run and means to position said pressure board in underlying relation to the said lower run for movement vertically toward and from the same including rotatably adjustable cam means beneath said pressure board adjacent opposite ends thereof and bearing members on the underside of said pressure board against which said cam means bear, at least one of said bearing members having flanges extending in transverse depending relation with respect to the underside of said pressure board at a position to locate the said flanges on opposite sides of the cam means engaged by the said one bearing members spaced from each other a distance sufficient to engage the said opposite sides of the said cam means to prevent endwise movement of the pressure board.

3. A dough molding machine as defined in claim 2 wherein the vertical spacing between said pressure board and the lower run of said endless belt is large enough to permit movement of said pressure board vertically a distance greater than the height of the flanges on said flange bearing member so that the said pressure board can be released for endwise movement by raising the same.

4. In a dough molding machine having a supporting framework and mechanism for sheeting and curling dough into spiral coils, an endless belt type conveyor having an upper run and a lower run; means for supporting said endless conveyor on said framework at a fixed position above the base of said machine, said upper run cooperating with said sheeting and curling mechanisms to form spiral coils of dough thereon, a pressure board to cooperate with the lower run of said conveyor in forming cylindrical rolls of dough from the spiral coils of dough delivered thereto from said upper run and means to position said pressure board in underlying relation to the said lower run for movement vertically toward and from the same including opposed structure forming upstanding abutments spaced slidably to receive said pressure board therebetween and to prevent lateral movement thereof, adjustable cam means to engage the underside of said pressure board adjacent opposite ends thereof when the said board is positioned between said abutments and bearing members on the underside of said pressure board against which said cam means operate, at least one of said bearing members having parts interengaging with said cam means when the pressure board rests thereon in operative position to prevent endwise movement of said pressure board, the said interengaging bearing member being releasable from engagement with said cam means by manually raising the pressure board.

5. In a dough molding machine having mechanisms for sheeting and curling dough into spiral coils, an elongated endless belt type conveyor supported in spaced relation to the base of said machine and having an upper and a lower run, said upper run cooperating with said sheeting and curling mechanisms to form spiral coils of dough thereon, an elongated pressure board having open ends and upstanding flanges extending from end to end thereof spaced a distance corresponding substantially to the width of said endless belt and means to support said pressure board in vertically spaced underlying relation to the lower run of said endless belt with the upstanding flanges thereon substantially aligned with the lateral edges of said endless belt including means to adjust said pressure board vertically with respect to the lower run of said belt so that spiral coils of dough delivered thereto are held at a position to be rolled along the same by the lower run of said belt to form cylindrical rolls, said upstanding flanges cooperating to twist the opposite ends of the cylindrical rolls to seal the same.

6. A dough molding machine as defined in claim 5 wherein the pressure board comprises an elongated strip of sheet metal having the longitudinal edges thereof bent upwardly to form the said upstanding flanges.

7. In a dough molding machine having a framework and dough sheeting and curling mechanisms, an endless belt type conveyor having laterally and transversely extending frame members fixedly interconnected to form an elongated generally rectangular shaped rigid frame, said conveyor having an upper run and a lower run, a rigid connection between one of said laterally extending frame members and the framework of said machine fixedly to support the said endless conveyor wholly on one side of the framework of said machine in a substatially horizontal plane elevated from the base of said machine to bring the said upper run to a position to cooperate with the said dough sheeting and coiling mechanisms in forming spiral coils of dough thereon and free of support except at said connection, a pressure board to cooperate with the lower run of said endless conveyor for rolling spiral coils of dough into cylindrical form and structure adjacent the forward end of said endless conveyor to deliver spiral coils of dough from the upper run of said endless conveyor to the lower run.

8. A dough molding machine as defined in claim 7 wherein aprons are provided on the top and bottom sides of said frame over the major portion of its length intermediate the ends thereof, the apron on the top side of said frame supporting the upper run of said belt against downward flexure and the apron on the bottom side of said frame preventing upward flexure of the lower run of said belt.

9. In a dough molding machine having a supporting framework and mechanisms for sheeting and curling dough, an endless conveyor having spaced rollers and an endless belt trained over said rollers to provide an upper and a lower run, a connection between one side of said conveyor and said framework rigidly to support the said conveyor wholly on one side of the said framework elevated from the base of said machine to bring the upper run thereof immediately below and in longitudinal alignment with said sheeting and curling mechanisms so as to cooperate therewith to form spiral coils of dough on said upper run, a pressure board to cooperate with the lower run of said endless conveyor belt for rolling spiral coils of dough into sealed cylinders, structure adjacent the forward end of said endless conveyor to deliver spiral coils of dough from the upper run of said endless conveyor belt to said pressure board and take-up mechanism for adjusting the tension in said endless conveyor belt including means individually to vary the spacing between the opposite ends of the axes of said rollers operable from the side of said endless conveyor opposite its connection to said frame.

10. In a dough molding machine having a supporting framework and mechanisms for sheeting and curling dough, an endless belt type conveyor having an elongated frame, a pair of rollers rotatably supported adjacent opposite ends of the frame on axes transverse thereto and an endless belt trained over said rollers to provide an upper and a lower run, means for connecting one side of the frame of said endless conveyor to the framework of said machine for fixedly supporting the said conveyor in a substantially horizontal plane wholly on one side of the said framework to bring the upper run thereof immediately below and in longitudinal alignment with said sheeting and curling mechanisms so as to cooperate therewith to form spiral coils of dough on the said upper run, a pressure board to cooperate with the lower run of said endless belt for rolling spiral coils of dough received from said upper run into cylindrical form and structure adjacent the forward end of said endless conveyor to deliver spiral coils of dough from the upper run of said endless belt to said pressure board, the support for one of the rollers in said endless conveyor including a pair of arms mounted respectively on opposite sides of said conveyor frame for reciprocatory movement in an endwise direction relative to the said frame, a pair of drive members rotatably mounted in said conveyor frame and having a driving connection with the rear ends of said arms respectively for advancing or retracting the same in response to opposite rotary movement of the said driving members and means individual to said driving members for individually rotating the same in opposite directions from closely adjacent positions on the side of said frame opposite its connection to the framework of the machine to vary the tension in said endless belt.

11. In a dough molding machine having a supporting framework and mechanisms for sheeting and curling dough, an endless conveyor including a frame, a pair of rollers supported respectively adjacent opposite ends of said frame, an endless belt trained over said rollers and take-up mechanism for shifting the axis of the forward roller in said conveyor forwardly and rearwardly with respect to the direction of travel of the upper run of said belt to control the tension in the said belt, the said upper run cooperating with said sheeting and curling mechanisms to form spiral coils of dough thereon, a pressure board underlying the lower run of said conveyor in downwardly spaced relation thereto and cooperating therewith to define a channel along which spiral coils of dough may be rolled by the said lower run, means for moving said pressure board vertically toward and from the said lower run, said means locking said pressure board against forward and backward movement, a deflector and means to support said deflector on said endless conveyor frame forward of the forward side of said endless belt including means for adjusting the deflector to a limited extent forwardly and rearwardly independently of adjustments in said pressure board and tensioning mechanism, said deflector guiding spiral coils of dough discharged by the upper run of said belt onto said pressure board.

References Cited in the file of this patent

UNITED STATES PATENTS

| Re. 18,545 | Sternberg | July 26, 1932 |
| 871,644 | Smith | Nov. 19, 1907 |
| 1,816,844 | Harber | Aug. 4, 1931 |
| 2,373,012 | Burdett et al. | Apr. 3, 1945 |
| 2,746,401 | Archer | May 22, 1956 |

FOREIGN PATENTS

| 1,103,752 | France | June 1, 1955 |

OTHER REFERENCES

Scientific American, October 27, 1911, page 314.